United States Patent
Moharir et al.

(10) Patent No.: US 9,552,348 B2
(45) Date of Patent: Jan. 24, 2017

(54) SYSTEM AND METHOD FOR OPERATING A COMPUTER APPLICATION WITH SPREADSHEET FUNCTIONALITY

(71) Applicants: Koustubh Moharir, Mumbai (IN); Surya Kumar Saripella, Hyderabad (IN); Sushant Reddy, Mumbai (IN); Krishnamurthy Vaidyanathan, Mumbai (IN)

(72) Inventors: Koustubh Moharir, Mumbai (IN); Surya Kumar Saripella, Hyderabad (IN); Sushant Reddy, Mumbai (IN); Krishnamurthy Vaidyanathan, Mumbai (IN)

( * ) Notice: Subject to any disclaimer, the term of this patent is extended or adjusted under 35 U.S.C. 154(b) by 223 days.

(21) Appl. No.: 14/317,493

(22) Filed: Jun. 27, 2014

(65) Prior Publication Data

US 2015/0378977 A1    Dec. 31, 2015

(51) Int. Cl.
*G06F 17/00* (2006.01)
*G06F 17/24* (2006.01)

(52) U.S. Cl.
CPC .................. *G06F 17/246* (2013.01)

(58) Field of Classification Search
CPC .................. G06F 17/246; G06F 17/2785
See application file for complete search history.

(56) References Cited

U.S. PATENT DOCUMENTS

| | | | | |
|---|---|---|---|---|
| 5,339,410 A * | 8/1994 | Kanai | ........... | G06F 8/41 |
| 5,418,902 A * | 5/1995 | West | ........... | G06F 17/246 |
| | | | | 708/168 |
| 5,471,575 A * | 11/1995 | Giansante | ........... | G06F 17/245 |
| | | | | 715/202 |
| 5,471,612 A * | 11/1995 | Schlafly | ........... | G06F 17/246 |
| | | | | 715/209 |
| 5,634,133 A * | 5/1997 | Kelley | ........... | G06T 11/206 |
| | | | | 345/440 |
| 5,727,161 A * | 3/1998 | Purcell, Jr. | ........... | G06F 17/246 |
| | | | | 705/30 |
| 6,317,758 B1 * | 11/2001 | Madsen | ........... | G06F 17/246 |
| | | | | 715/220 |
| 6,523,167 B1 * | 2/2003 | Ahlers | ........... | G06F 17/246 |
| | | | | 715/219 |
| 7,178,098 B2 * | 2/2007 | Bauchot | ........... | G06F 17/246 |
| | | | | 715/212 |
| 8,239,778 B2 * | 8/2012 | Sheth-Voss | ........... | G06F 17/3056 |
| | | | | 707/805 |
| 8,856,151 B2 * | 10/2014 | George | ........... | G06F 17/30592 |
| | | | | 707/755 |

(Continued)

*Primary Examiner* — Laurie Ries
(74) *Attorney, Agent, or Firm* — Symbus Law Group, LLC; Clifford D. Hyra

(57) ABSTRACT

The present invention provides a method for operating a computer application with spreadsheet functionality. The method comprising receiving one or more inputs in one or more cells by the spreadsheet application, parsing the received inputs for the one or more cells of the spreadsheet, constructing a dependency graph for the one or more parsed input cells, evaluating at least one of the one or more parsed input cells based on one or more criteria in the dependency graph, reconstructing the dependency graph until all of the one or more input cells are evaluated, and returning an output to the spreadsheet application.

13 Claims, 5 Drawing Sheets

(56) References Cited

U.S. PATENT DOCUMENTS

| | | | | |
|---|---|---|---|---|
| 9,037,961 | B1* | 5/2015 | Mansell | G06F 17/246 |
| | | | | 715/212 |
| 2002/0023105 | A1* | 2/2002 | Wisniewski | G06F 17/246 |
| | | | | 715/212 |
| 2002/0095399 | A1* | 7/2002 | Devine | G06F 17/3089 |
| 2006/0069696 | A1* | 3/2006 | Becker | G06F 17/246 |
| 2006/0080594 | A1* | 4/2006 | Chavoustie | G06F 17/246 |
| | | | | 715/218 |
| 2006/0224946 | A1* | 10/2006 | Barrett | G06F 17/246 |
| | | | | 715/210 |
| 2007/0250295 | A1* | 10/2007 | Murray | G06Q 10/10 |
| | | | | 703/2 |
| 2008/0028287 | A1* | 1/2008 | Handsaker | G06F 17/246 |
| | | | | 715/212 |
| 2009/0012842 | A1* | 1/2009 | Srinivasan | G06F 17/30684 |
| | | | | 705/12 |
| 2010/0131715 | A1* | 5/2010 | Gould | G06F 17/246 |
| | | | | 711/129 |
| 2011/0231748 | A1* | 9/2011 | Chopin | G06Q 10/10 |
| | | | | 715/212 |
| 2011/0307773 | A1* | 12/2011 | Grmusa | G06Q 10/0631 |
| | | | | 715/215 |
| 2014/0258189 | A1* | 9/2014 | Schmidt | G06N 99/005 |
| | | | | 706/12 |

* cited by examiner

SYSTEM AND METHOD FOR OPERATING A COMPUTER APPLICATION WITH SPREADSHEET FUNCTIONALITY

FIELD OF INVENTION

The present invention relates generally to spreadsheet applications, and more particularly to system and methods for operating spreadsheet applications.

BACKGROUND

A spreadsheet provides a functional programming framework to many users allowing them to build graphic as a chain of formulas that link various cells. The spreadsheet decides the order of computation of these formulas by creating a 'Dependency graph'—which is inherently static. Every cell in the spreadsheet could contain a value or a formula, and all the cells, only evaluate the formulas that are contained within them. Since no new cells are generated, the act of evaluation in itself does not change the dependency graph, before and after the calculation. This current model is universally adopted across all spreadsheet platforms. The U.S. Pat. No. 7,266,763 describes a method that allows the user to abstract a given chain of calculations into re-usable, user-defined functions works on a spreadsheet with a static dependency graph. The functions can be customized by the user unlike the built-in functions that are provided in spreadsheets.

However, large parts of the real world problems involve chain of calculations, where the nature of a given calculation in that chain varies with the outcome of the preceding calculations in the same chain. For example, when the number of cells that need to evaluate a given formula is itself dependent on the outcome of some other preceding calculation. A static formula does not disturb the dependency graph on evaluation, but this can be disadvantageous as it cannot create or delete new cells. Therefore, it is difficult to build business models using spreadsheets having static data dependency. Spreadsheets in their current form will not be able to handle dynamic inter-dependency in calculation chains, and a user will not be able to define custom functions in such scenarios. It is because of this reason that user defined functions described in U.S. Pat. No. 7,266,763 are of limited value, and users need to employ programming languages to solve complex tasks on spreadsheets.

In light of the above discussion, there is a need for a method and system that overcomes all the above stated problems.

BRIEF DESCRIPTION OF THE INVENTION

The above-mentioned shortcomings, disadvantages and problems are addressed herein which will be understood by reading and understanding the following specification.

The present invention provides a method for operating a computer application with spreadsheet functionality. The method comprising receiving one or more inputs in one or more cells by the spreadsheet application. The next step comprising parsing the received inputs for the one or more cells of the spreadsheet, constructing a dynamic dependency graph for the one or more parsed input cells. The one or more parsed input cells are evaluated based on one or more criteria in the dependency graph. The dependency graph is reconstructed until each of the one or more input cells are evaluated. In the final step, the output is returned to the spreadsheet application, wherein the output is returned to one or more cells.

The system for operating a computer application with spreadsheet functionality, the system comprising a display device, a means for receiving one or more inputs by the spreadsheet application, a means for parsing the received inputs, a means for constructing a dependency graph for the one or more parsed input cells, a means for evaluating at least one of the one or more parsed input cells based on one or more criteria in the dependency graph, a means for reconstructing the dependency graph until all of the one or more input cells are evaluated, and a means for returning an output to the spreadsheet application, wherein the output is returned to one or more cells.

DETAILED DESCRIPTION OF THE EMBODIMENTS

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that graphical, mechanical, electrical and other changes may be made without departing from the scope of the embodiments. The following detailed description is, therefore, not to be taken in a limiting sense.

Figure 1:
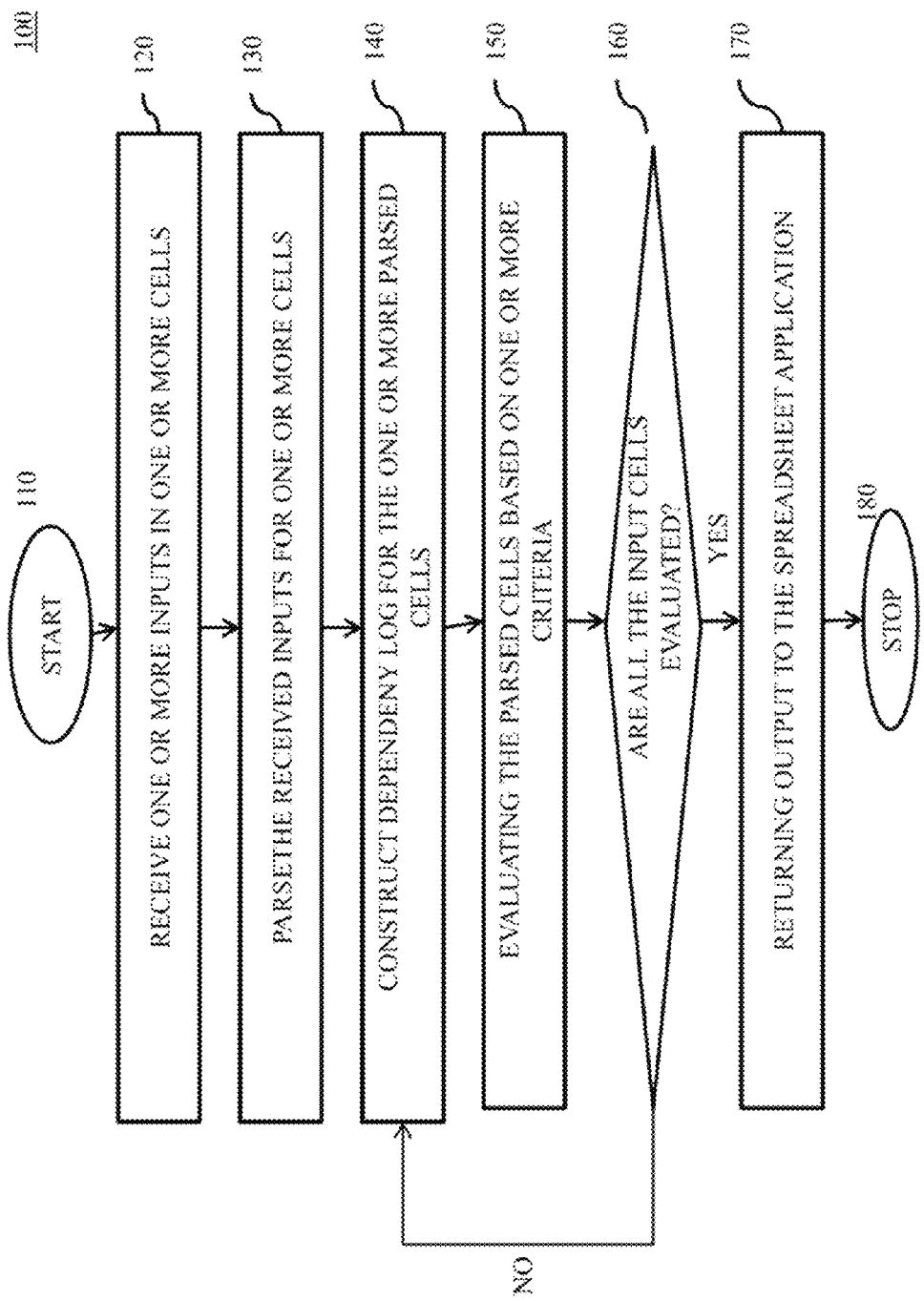
FIG. 1 is a flowchart for operating a computer application with spreadsheet functionality, in accordance with various embodiments of the present invention.

FIG. 1 illustrates a flowchart 100 for operating a computer application with spreadsheet functionality. The spreadsheet application comprises one or more input cells that receive input from the user and one or more output cells that return the output to the user after evaluation process. The flowchart initiates at step 110. At step 120, the spreadsheet receives one or more inputs in one or more cells. In an embodiment, the input can be a constant value. For example, the constant value can be any alphanumeric character such as 5, 5.6, 8 and the like. In another embodiment, the input can be a formula. For example, the formula can be B1+A1, B1*A1 and the like. In yet another embodiment, the input can be a function. A function in the spreadsheet application is a predetermined formula. Examples of function include but not limited to VLOOKUP, SUM, MATCH and the like. Similar to formulas, any of these functions can be called in the one or more cells by using 'call function', wherein an equal sign (=) followed by the function's name and its arguments is present in the cell. The arguments are enclosed inside round brackets. The arguments may themselves be the names of other functions or cell references containing the names of other functions. This enables the ability to pass functions as well as variables as arguments. The function defines the calculation to be executed by the spreadsheet application. Further, the function can be an ordinary function wherein the function outputs a constant value to the spreadsheet application, or a special function wherein the function outputs plurality of formulae to the spreadsheet application. In an embodiment, the input to the spreadsheet application is written by an end-user. For example, the end-user can be a programmer, a business development model analyst, a data scientist and the like. In another embodiment, the input to the spreadsheet application is written by a computer application automatically. The spreadsheet application receives the inputs to one or more cells and processes it.

At step 130, the received one or more inputs are parsed by the spreadsheet application. The parsing is done for each cell of the received input cells. Parsing is a process of taking one or more inputs and building a hierarchical structure, giving a structural representation of the plurality of inputs, checking for correct syntax in the process and the like. In an embodiment, parsing of the input is done by the computer application. In another embodiment, parsing of the input is done by a parser. Parsing may be programmed by hand or may be automatically or semi-automatically generated by a parser generator. In an embodiment, the parsing of the received input is done by the compiler of the spreadsheet application. Parsing of the received one or more input cells can be done in one or more ways. For example, parsing may be done by top-bottom parsing, bottom-top parsing and the like.

At step 140, adynamic dependency graph is created for each of the parsed cells. The term 'dynamic' refers to the ability of the present invention to construct the dependency graph upon of each of the one or more input cells which result in addition of new cells or deletion of existing cells in the spreadsheet application. The dependency graphrefers to the quantifying of the one or more parsed cells based on one or more parameters associated with the data present in one or more parsed cells by the spreadsheet application of the current invention. The method of creating and using the dynamic dependency graph for the purpose of the current invention is explained in greater details in the following sections of the detailed description with the help of illustrative figure and examples.

At step 150, the one or more parsed cells are evaluated based on one or more criteria set in the dependency graph. For example, one of the criteria is determination of effective weights of all the parsed cells and evaluating the cells with maximum effective weight.

Further, at step 150, the parsed cells are evaluated according to the various embodiments of the present invention. For example, the one or more input cells are evaluated in the order of their respective maximum effective weights and the number of dependents. Evaluation of the parsed cell (e.g. B1) results in addition or deletion of cells in the spreadsheet application in accordance with the type of input present in the cell being evaluated. For e.g. evaluation of cell B2 results in addition of new cells B5-B8 with the value of B1 in each of the cells. As such, the dependency graph for the current parsed cells is no more valid. Thus, a loop is formed at step 160 to take into account the new cells added or existing cells deleted. As a result, the dependency graph is reconstructed in order to evaluate all the parsed cells. Thus, the dynamic nature of the dependency graph is established resulting in evaluation of all the input cells in accordance with various embodiments of the present invention. At step 170, all the parsed input cells are evaluated and the output is returned to the one or more cells to the end user. In an embodiment, the output is returned to one or more new cells in accordance with one or more inputs received in the one or more cells. At step 180, the process ends.

Figure 2:
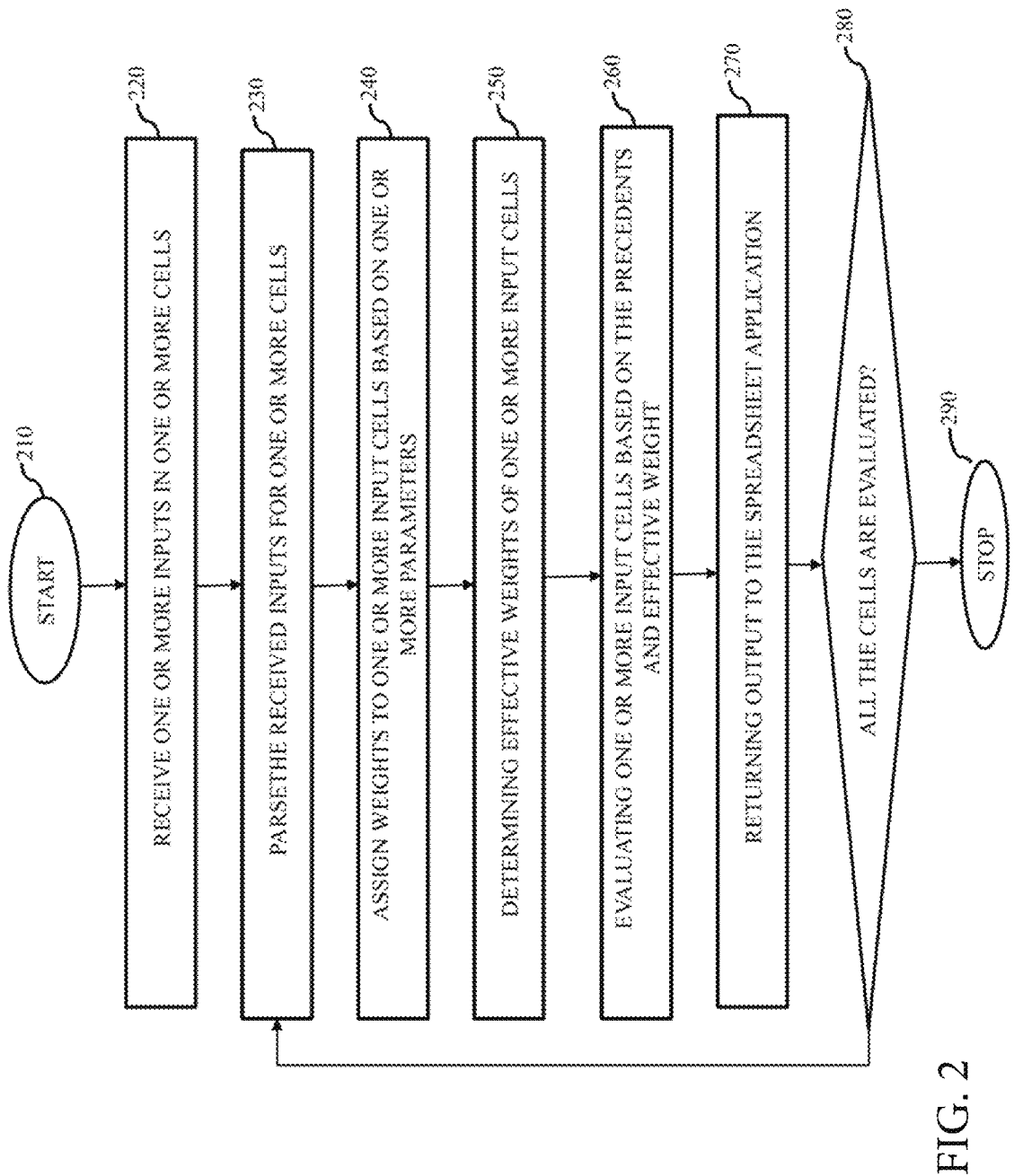
FIG. 2 illustrates a flowchart for operating a computer application with spreadsheet functionality using effective weights as a parameter for evaluation in accordance with particular embodiments of the present invention.

FIG. 2 illustrates a flowchart for an exemplary embodiment for operating a computer application with spreadsheet functionality in the context of the present invention. The spreadsheet application comprises one or more input cells that receive input from the user and one or more output cells that return the output to the user after evaluation process. The flowchart initiates at step 210. At step 220, the spreadsheet receives one or more inputs in one or more cells. In an embodiment, the input can be a constant value. For example, the constant value can be any alphanumeric character such as 5, 5.6, 8 and the like. In another embodiment, the input can be a formula. For example, the formula can be B1+A1, B1*A1 and the like. In yet another embodiment, the input can be a function. A function in the spreadsheet application is a predetermined formula. Examples of function include but not limited to VLOOKUP, SUM, MATCH and the like. Similar to formulas, function begins with the equal sign (=) followed by the function's name and its arguments. The arguments are enclosed inside round brackets. The arguments may themselves be the names of other functions or cell references containing the names of other functions. This enables the ability to pass not just data but functions as arguments. The function defines the calculation to be executed by the spreadsheet application. Further, the function can be an ordinary function wherein the function outputs a constant value to the spreadsheet application, or a special function wherein the function outputs plurality of formulae to the spreadsheet application. In an embodiment, the input to the spreadsheet application is written by an end-user. For example, the end-user can be a programmer, a business development model analyst, a data scientist and the like. In another embodiment, the input to the spreadsheet application is written by a computer application automatically. The spreadsheet application receives the inputs to one or more cells and processes it.

At step 230, the received one or more inputs are parsed by the spreadsheet application. The parsing is done for each cell of the received input cells. In an embodiment, parsing of the input is done by the computer application. In another embodiment, parsing of the input is done by a parser. Parsing may be programmed by hand or may be automatically or semi-automatically generated by a parser generator. In an embodiment, the parsing of the received input is done by the compiler of the spreadsheet application. Parsing of the received one or more input cells can be done in one or more ways. For example, parsing may be done by top-bottom parsing, bottom-top parsing and the like.

At step 240, a weight is assigned to each of the parsed cells. The weights to each of the parsed cells are assigned according to one or more parameters. The parameters for assigning weights to each of the cells in the spreadsheet are according the type of the input received by each cell. Each of the cells in the spreadsheet application having an input are assigned a weight. In the context of the present invention, the weights are assigned as 1, 2, 3 and 4. Similarly, the weights can be represented in any manner to indicate an increasing or decreasing order of the weights. In the context of the present invention, a cell is assigned with a cell weight=1 if the input received by that cell is a constant value or an ordinary formula. Similarly, a cell is assigned with a cell weight=2 if the received by that cell comprises a formula that writes constant values or ordinary formula to other cells. Further, a cell is assigned with a cell weight=3 if that cell comprises a formula that writes undetermined formulas to other cells. An undetermined formula can be a tertiary function that presents the output according to the one or more predecessor formula In another embodiment, a cell is assigned with a cell weight=3 if that cell comprises a formula that writes an output to undetermined cells in the spreadsheet application. For example, a function FILL-DOWNFOR,A1 writes output to all the undetermined cells below A1 in the spreadsheet application. Furthermore, a cell is assigned with a cell weight=4 if that cell comprises a formula that generates formulas which can potentially write outputs to other cells. The method of assigning weights to one or more input cells is described in greater details in the later sections of the document.

At step 250, effective weight of each of the cell is determined. Effective weight of each cell is determined by the processor as the maximum of its own weight and the weight of all its dependent cells. In the context of the present example, consider the table below for determination of weights and maximum effective weights:

Similarly, the effective weight of B2 is 4 as the cell weight of B2 as the maximum of its cell weight and cell weight of its dependencies is 4. Accordingly, the cell weights of other cells can be calculated.

At step 260, the cells are evaluated according to the effective weights of the one or more input cells. The one or more input cells are evaluated in the order of their respective maximum effective weights and the number of dependents. According to the above table, the cell with maximum effective weight is 4. Therefore, the cell B1 is evaluated first. As a result of evaluation step, new cells are generated or existing cells are deleted. The output of the one or more parsed cells is returned to the spreadsheet application at step 270. As a result of step 260 and 270, a loop is established to determine the dependency of all the altered cells at step 280. The loop continues until all the parsed input cells are evaluated. and the output is returned to one or more cells in the spreadsheet application. At step 290, the process ends.

The Table 2 below illustrates the dependency graph for a specific example in accordance with the flow chart described in FIG. 3. As can be seen, cell B2 comprises a formula "=FillRightFor (B5:B8, B1)". Since this formula is dependent on the value of B1 and the evaluation of this cell returns

| Cell | Constant | Formula | Dependencies (Precedents) | Outputs (if any) | Weight | Effective Weight | Already Evaluated? | Result (if evaluated) |
|------|----------|---------|---------------------------|------------------|--------|------------------|--------------------|-----------------------|
| B1 | 3 | — | None | None | 1 | 4 | Yes | 3 |
| B2 | — | =FillRightFor(B5:B8, B1) | B1 | Region to the right of B5:B8 | 4 | 4 | No | NA |
| B5 | — | =FillDownFor(B8, B6) | B6 | Region below B8 | 2 | 2 | No | NA |
| B6 | 4 | — | None | None | 1 | 2 | Yes | 4 |
| B7 | 0 | — | None | None | 1 | 1 | Yes | 0 |
| B8 | — | =A8 + B7 + 1 | A8 & B7 | None | 1 | 1 | No | NA |
| E2 | — | =SUM(RegionAcross(B8)) | All cells across B8 | None | 1 | 1 | No | NA |

The cell B1 has a constant value as its input, therefore, it does not have any dependencies. Since the cell B1 does not have any dependency, its cell weight=1. Further, in the B2 has an input, which is a function. The function is defined as [=FillRightFor(B5:B8, B1)]. Here, the cell B2 is dependent on B1 and also B2 is a function that writes undetermined formulas to other cells, i.e., the region to the right of B5:B8. The cell B2 has the capability to generate new cells in the spreadsheet application or delete one or more cells from the spreadsheet application. Therefore, the cell weight of cell B2=4. Furthermore, the effective weight of cell B1 is the maximum of its own weight and the weight of all its dependencies. Therefore, the effective weight of B1 is 4 as B2 is dependent on B1 and the cell weight of B2 is 4.

output to cells B5-B8, which in turn may comprise another formula. Thus the weight for cell B2 is 4 and since the effective weight is the highest of the weight of the cell and its dependencies, the effective weight of cell B2 is 4. Similarly, for cell B1 the weight is 1 and effective weight is 4 as B2 is dependent on B1 and carries a weight of 4. Further, B5 and B6 have an effective weight of 2. Now, the cell having maximum effective weight and the least number of dependencies is evaluated first in the order of decreasing maximum effective weight. As a result, cell B1 is returned as the output cell since it comprises a constant. Next, cell B2 is having a maximum effective weight of 4 and one dependency, ie. B1 and therefore will be evaluated. This results in the value of B1 being filled in the cells to the right of B5-B8.

| Cell | Constant | Formula | Dependencies (Precedents) | Outputs (if any) | Weight | Effective Weight | Already Evaluated? | Result (if evaluated) |
|------|----------|---------|---------------------------|------------------|--------|------------------|--------------------|-----------------------|
| B2 | — | =FillRightFor(B5:B8, B1) | B1 | Region to the right of B5:B8 | 4 | 4 | Yes | FillRightFor |
| B1 | 3 | — | None | None | 1 | 4 | Yes | 3 |
| B6 | 4 | — | None | None | 1 | 2 | Yes | 4 |
| C6 | 4 | — | None | None | 1 | 2 | Yes | 4 |
| D6 | 4 | — | None | None | 1 | 2 | Yes | 4 |
| B7 | 0 | — | None | None | 1 | 1 | Yes | 0 |
| C7 | 0 | — | None | None | 1 | 1 | Yes | 0 |
| D7 | 0 | — | None | None | 1 | 1 | Yes | 0 |
| B5 | — | =FillDownFor(B8, B6) | B6 | Region below B8 | 2 | 2 | No | NA |
| C5 | — | =FillDownFor(C8, C6) | C6 | Region below C8 | 2 | 2 | No | NA |
| D5 | — | =FillDownFor(D8, D6) | D6 | Region below D8 | 2 | 2 | No | NA |
| B8 | — | =A8 + B7 + 1 | A8 & B7 | None | 1 | 1 | No | NA |

-continued

| Cell | Constant | Formula | Dependencies (Precedents) | Outputs (if any) | Weight | Effective Weight | Already Evaluated? | Result (if evaluated) |
|---|---|---|---|---|---|---|---|---|
| E2 | — | =SUM(RegionAcross(B8)) | All cells across B8 | None | 1 | 1 | No | NA |
| C8 | — | =B8 + C7 + 1 | B8 & C7 | None | 1 | 1 | No | NA |
| D8 | — | =C8 + D7 + 1 | C8 & D7 | None | 1 | 1 | No | NA |

Now the dependency graph of the one or more cells in the spreadsheet application is reconstructed in accordance with various embodiments of the present invention. The dependency graph construction refers to the method of parsing the one or more cells, assigning weights and identifying cells with maximum effective weights as illustrated in FIG. 2 and FIG. 3. Evaluation of the input cell B2 results in generation of new cells C6, D6, C7, D7 etc. As described in other sections of the detailed description, the spreadsheet application at this point does not evaluate cell B5, B8, E2 etc., it instead parses the cells C6, D6, C7, D7 etc and assigns the weight in accordance with various embodiments of the present invention. Further, the effective weights of the one or more new cells are determined and the cells with maximum effective weights are evaluated and the output is returned. Thus for the above mentioned example, cell B1 is evaluated first, followed by the order cell B2, B6, C6, D6, B5, C5, D5, B7, C7, D7, B8, C8, D8 and E2.

In yet another embodiment of the present invention, the one or more input cells in the spreadsheet application comprising one or more formulae or functions are encapsulated to create a user defined function. The user defined function is then stored in the libraries of spreadsheet application and is configured for exporting to other spreadsheet applications. The creation of user defined function in the spreadsheet application using the current invention is described in more details with the help of specific example in Table 3 below.

sum of all the integers is then returned as the output in cell F5. As can be seen, the cells C2 and C3 have an effective weight of 2 and no dependencies. Therefore, C2 and C3 are evaluated first, followed by C5 to C17 and finally F5. The user defined function "sum_conseq_integers" in cell F2 is then compiled and stored in the libraries of spreadsheet application. In yet another embodiment of the present invention, the user defined function is exported in other spreadsheet applications.

In yet another embodiment of the present invention, the one or more input cells comprising the one or more user defined or built in functions are evaluated using a 'call function'. In the context of the present invention, the call function is invoked as:

=CallFunction(A1, B1)

where A1 is the input cell comprising the label for one or more user defined or built in functions and B1 is the input cell comprising the parameters to be passed to the function in cell A1. The one or more function labels in the cell A1 are also described as 'called functions'. The one or more input cells comprising the call function are evaluated in accordance with various embodiments of the present invention. For example, if the called function has an effective cell weight of 2 and the parameters passed on to the called function are constants, having an effective weight of 1, the called function is evaluated dynamically.

Figure 3:
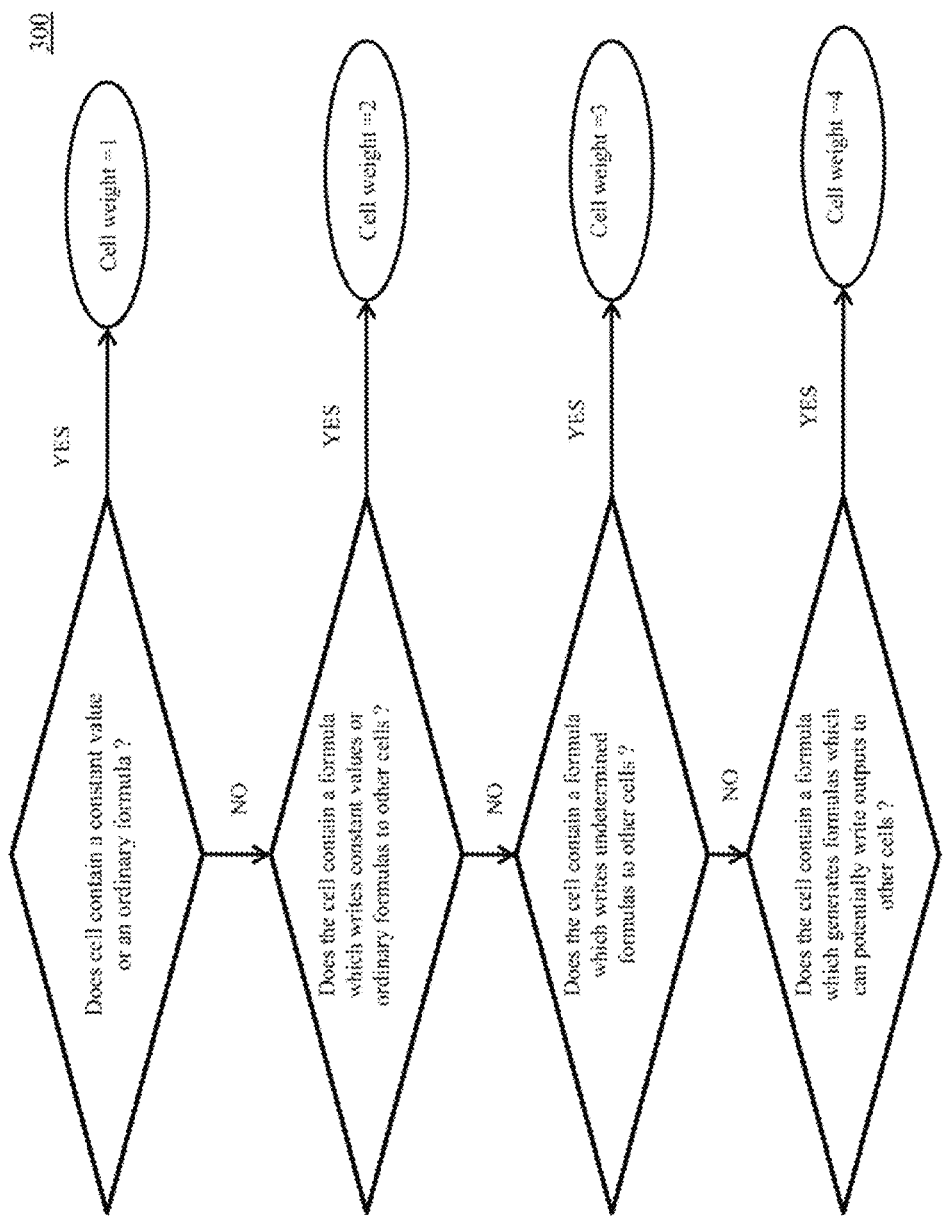
FIG. 3 is a flowchart for assigning plurality of weights to the plurality of cells in the spreadsheet application, in accordance with various embodiments of the present invention.

FIG. 3 illustrates a flowchart for the method of assigning weights to the values contained in the one or more cells of

| Cell | Constant | Formula | Dependencies (Precedents) | Outputs (if any) | Weight | Effective Weight | Already Evaluated? | Result (if evaluated) |
|---|---|---|---|---|---|---|---|---|
| C2 | 10 | — | None | None | 1 | 2 | Yes | 10 |
| C3 | 10 | — | None | None | 1 | 2 | Yes | 10 |
| C5 | — | =FillDownFor(C9, C3 − 1) | C3 | Region below C9 | 2 | 2 | Yes | FillDownFor |
| C8 | — | =C3 | C3 | None | 1 | 1 | Yes | 10 |
| C9 | — | =C8 + 1 | C8 | None | 1 | 1 | Yes | 11 |
| C10 | — | =C9 + 1 | C9 | None | 1 | 1 | Yes | 12 |
| C11 | — | =C10 + 1 | C10 | None | 1 | 1 | Yes | 13 |
| C12 | — | =C11 + 1 | C11 | None | 1 | 1 | Yes | 14 |
| C13 | — | =C12 + 1 | C12 | None | 1 | 1 | Yes | 15 |
| C14 | — | =C13 + 1 | C13 | None | 1 | 1 | Yes | 16 |
| C15 | — | =C14 + 1 | C14 | None | 1 | 1 | Yes | 17 |
| C16 | — | =C15 + 1 | C15 | None | 1 | 1 | Yes | 18 |
| C17 | — | =C16 + 1 | C16 | None | 1 | 1 | Yes | 19 |
| F5 | — | =SUM(Region Down(C8)) | Range Below C8 | None | 1 | 1 | Yes | 145 |
| F2 | — | =DefineFunction("sum_conseq_integers", C2, C3, F5) | C2, C3 & F5 (an in-turn all the intermediate dependencies) | None | 1 | 1 | Yes | sum_conseq_integers |

As described in Table 3 above, the user defines a new function for calculating the sum of all the integers in a given range of cells. The new function is defined in cell F2, i.e. 'DefineFunction("sum_conseq_integer", C2, C3, F5)' having an effective weight of 1 and depends on the values of C2, C3 and F5. Further, the user provides the values of the starting number and the total count in cells C2 and C3. The the spreadsheet application in accordance with various embodiments of the present invention. The method of assigning weights is also the method for determining dependencies of the one or more input cells in accordance with various embodiments of the present invention. For example, if the one or more input cells comprise of a constant value such as any alphanumeric variable or a simple formula such as =[B1]+[A1] or [B1]*[A1] that do not reference to any other cells in the spreadsheet, then the input cell is assigned a weight '1'. Similarly, if the one or more input cells comprise a formula that returns a constant value or another simple formula in one or more cells then the cell is assigned a weight of '2'. For example, a formula such as =FILL-DOWNFOR [B8, B6] etc. are dependent on the values of the variable B6. Further, the evaluation of these formula results in the output being returned to a new cell i.e. B8. In a similar manner, a weight '3' is assigned to the one or more input cells comprising a formula whose evaluation results in undetermined formula in the one or more output cells. Finally, the one or more input cells comprising one or more formula that on evaluation results in a second set of formula that on further evaluation result in output being returned to new cells are assigned a weight of '4'. In this manner, the weight of individual cells in the spreadsheet application is determined before calculating the effective weight. It is to be noted that the plurality of weights 1, 2, 3, 4 as described in the context of the current invention are presented here to aid the understanding of the person of skill in the art. In practice, the weights may take form of any alphanumeric or symbolic value that can represent the order of the input in spreadsheet application.

Figure 4:
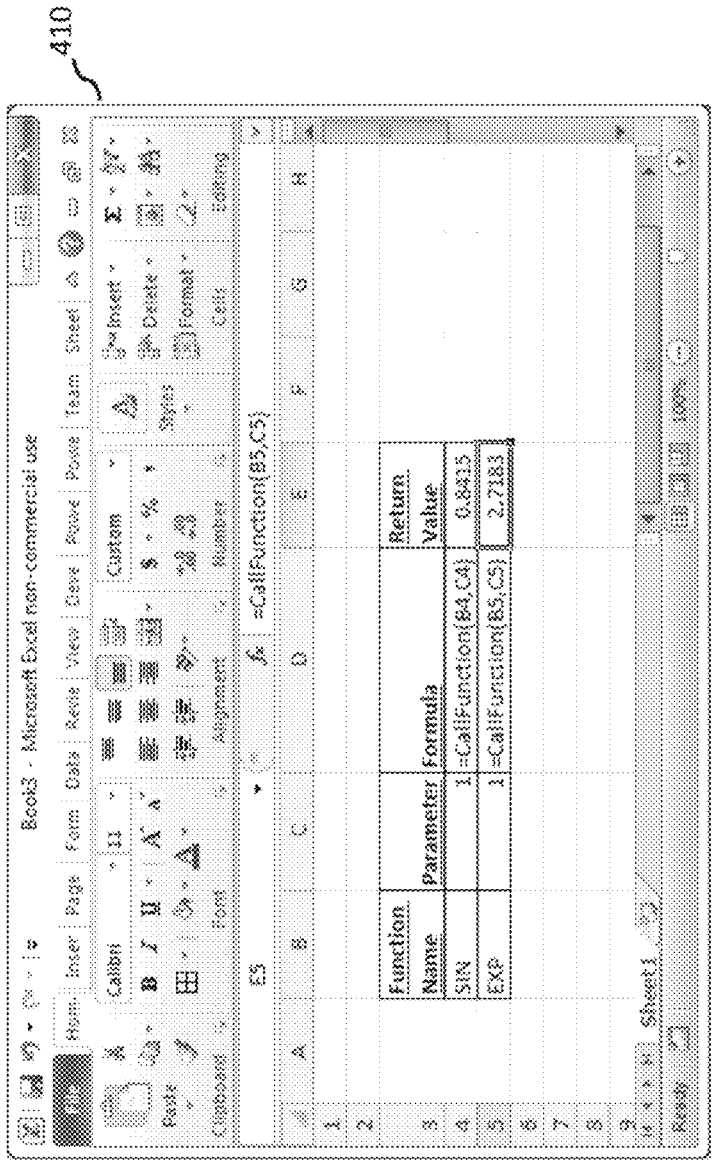
FIG. 4 is an exemplary embodiment for operating a computer application with spreadsheet functionality, in accordance with various embodiments of the present invention.

FIG. 4 illustrates an example for operating the spreadsheet application using call function of the present invention. The spreadsheet application 410 running on the computing device comprises of a plurality of input cells and output cells. As shown, input cells B4, B5 comprise built in functions namely SIN for determining sine value of a given variable and EXP for determining exponential value of a given variable respectively. In an embodiment, the input cells comprise of user defined functions as well. Cells C4, C5 contain the variables for the corresponding functions. In accordance with the present embodiment, the call function invokes the SIN and EXP functions in cells B6 and C6 respectively. As a result, the dependency graph of all the input cells is constructed to obtain the cells with maximum effective weight, i.e. cells B6 and C6. Further, the dependency graph is resolved to return the output to cells B7 and C7 dynamically.

Figure 5:
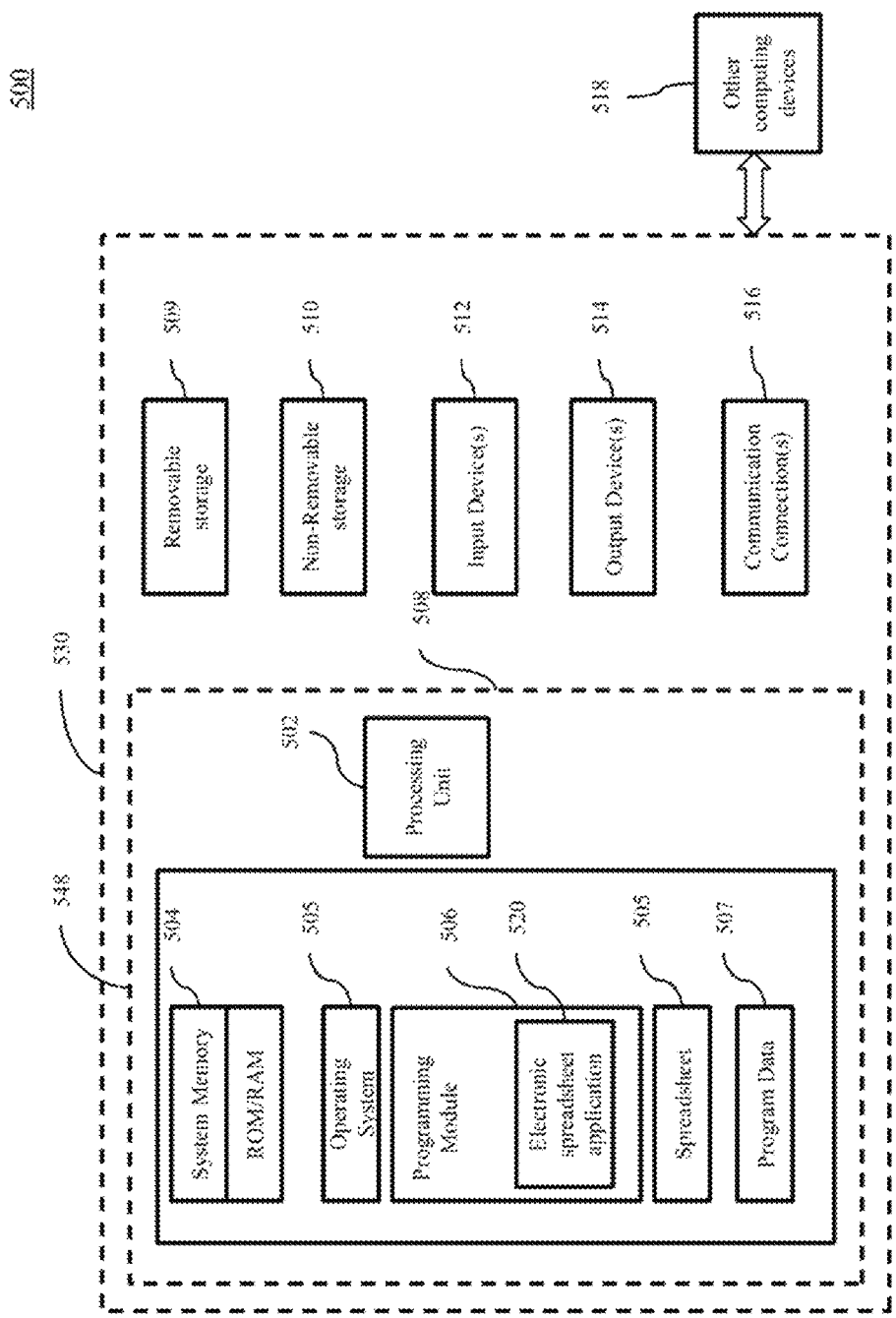
FIG. 5 is a system for operating a computer application with spreadsheet functionality, in accordance with various embodiments of the present invention.

With reference to FIG. 5, a system consistent with an embodiment of the invention may include a computing device, such as computing device 530. In a basic configuration, computing device 530 may include at least one processing unit 502, a system memory 504 and a processing unit 502. The processing unit 502 may comprise multiple processors. Depending on the configuration and type of computing device, system memory 504 may comprise, but is not limited to, volatile (e.g. random access memory (RAM)), non-volatile (e.g. read-only memory (ROM)), flash memory, and the like. System memory 504 may include operating system 505, one or more programming modules 506, and may include a program data 507, and a spreadsheet. Operating system 505, for example, may be suitable for controlling the operation of computing device 530. In one embodiment, programming modules 506 may include electronic spreadsheet application 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 530 may have additional features or functionality. For example, computing device 530 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technography for storage of information, such as computer readable instructions, data structures, program modules, or other data. System memory 504, removable storage 509, and non-removable storage 510 are all computer storage media examples (i.e. memory storage). Computer storage media may include, but is not limited to, RAM, ROM, electrically erasable read-only memory (EEPROM), flash memory or other memory technography, CD-ROM, digital versatile disks (DVD) or other optical storage, magnetic cassettes, magnetic tape, magnetic disk storage or other magnetic storage devices, or any other medium which can be used to store information and which can be accessed by computing device 530. Any such computer storage media may be part of device 530. Computing device 530 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 530 may also contain a communication connection that may allow device 530 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including the operating system 505. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in a hardware and/or in a software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may include but is not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

As disclosed in various embodiments, the advantage of the present invention include but are not limited to the ability to overcome the prior art by performing dynamic resolution of the input cells in the spreadsheet application. This allows the user to solve complex graphical problems using the spreadsheet application without having to write a program for breaking down and solving the problem. Further, the present invention provides another advantage by allowing users to encapsulate the dependency graph resolution of the graphic. This helps users to store the solutions as functions in spreadsheet application libraries. These user defined functions can be imported to other spreadsheet applications independent of the computing environment.

This written description uses examples to describe the subject matter herein, including the best mode, and to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a computer application with a spreadsheet functionality, the method comprising:
 a. receiving an input in one or more input cells of a spreadsheet application;
 b. parsing the one or more input cells, wherein the one or more input cells comprises one of a value, a formula, and a function;
 c. constructing a dynamic dependency graph for the one or more input cells in the spreadsheet application;
 d. evaluating at least one of the one or more input cells based on at least one criteria derived from the dynamic dependency graph, wherein the evaluation results in one of addition of new cells and deletion of existing cells; and
 e. returning an output to one or more output cells in the spreadsheet application.

2. The method of claim 1, wherein the at least one criteria comprises determination of effective weights for each of the one or more input cells.

3. The method of claim 1, wherein the output is returned to one or more new cells in the spreadsheet application.

4. The method of claim 1, wherein the one or more input cells comprises a user defined function that is compiled and stored in a spreadsheet application library.

5. The method of claim 1, wherein the one or more input cells comprises labels of one or more functions and parameters to call the one or more functions.

6. The method of claim 5, wherein the one or more functions in the one or more input cells are one of user-defined functions and built-in functions.

7. A system for operating a computer application with spreadsheet functionality, the system comprising:
 a. a display device; and
 b. one or more programming modules configured to:
   receive an input in one or more input cells of a spreadsheet application;
   parse the one or more input cells;
   construct a dynamic dependency graph for the one or more input cells;
   evaluate at least one of the one or more input cells based on at least one criteria derived from the dynamic dependency graph;
   reconstruct the dependency graph until each of the one or more input cells are evaluated; and
   return an output to one or more output cells in the spreadsheet application.

8. The system of claim 7, wherein the system further comprises a system memory for storing the output of the spreadsheet application.

9. The system of claim 8, wherein the system memory further stores one or more user defined functions.

10. A method of operating a computer application with a spreadsheet functionality, the method comprising:
   a. receiving an input in one or more input cells of a spreadsheet application;
   b. parsing the one or more input cells, wherein the one or more input cells comprises one of a value, a formula, and a function;
   c. constructing a dynamic dependency graph for the one or more input cells in the spreadsheet application;
   d. evaluating at least one of the one or more input cells based on effective weights being derived for each of the one or more input cells from the dynamic dependency graph, wherein the evaluation results in one of addition of new cells and deletion of existing cells; and
   e. returning an output to one or more output cells in the spreadsheet application.

11. The method of claim 10, wherein the one or more input cells comprises a user defined function that is compiled and stored in a spreadsheet application library.

12. The method of claim 10, wherein the one or more input cells comprises labels of one or more functions and parameters to call the one or more functions.

13. The method of claim 12, wherein the one or more functions in the one or more input cells are one of user-defined functions and built-in functions.

* * * * *